(12) United States Patent
Zawde et al.

(10) Patent No.: US 7,825,797 B2
(45) Date of Patent: Nov. 2, 2010

(54) PROXIMITY SENSOR DEVICE AND METHOD WITH ADJUSTMENT SELECTION TABS

(75) Inventors: Fidel Zawde, Santa Clara, CA (US); Thuy T. B. Le, Santa Clara, CA (US); John Feland, San Jose, CA (US); Ray Alexander Trent, Jr., San Jose, CA (US); Mark Huie, Sunnyvale, CA (US)

(73) Assignee: Synaptics Incorporated, Santa Clara, CA (US)

( * ) Notice: Subject to any disclaimer, the term of this patent is extended or adjusted under 35 U.S.C. 154(b) by 756 days.

(21) Appl. No.: 11/445,875

(22) Filed: Jun. 2, 2006

(65) Prior Publication Data

US 2007/0283263 A1    Dec. 6, 2007

(51) Int. Cl.
*G08B 1/08* (2006.01)
(52) U.S. Cl. .............................. 340/539.23; 340/539.1; 340/539.22; 340/531; 340/461; 345/156; 345/157; 345/158; 345/173; 715/728; 715/862; 341/33; 178/18.06
(58) Field of Classification Search ................. 345/156, 345/157, 158, 173–179; 340/539.23, 539.22, 340/531, 461; 715/700, 727, 728, 762–764, 715/771, 787, 862–864; 341/20, 33, 34, 341/35; 178/18.01–20.01
See application file for complete search history.

(56) References Cited

U.S. PATENT DOCUMENTS

| | | |
|---|---|---|
| 3,234,512 A | 2/1966 | Burkhart |
| 3,478,220 A | 11/1969 | Milroy |
| 4,103,252 A | 7/1978 | Bobick |
| 4,110,749 A | 8/1978 | Janko et al. |
| 4,177,421 A | 12/1978 | Thornburg |

(Continued)

FOREIGN PATENT DOCUMENTS

CA    2 316 104 A1    2/2001

(Continued)

OTHER PUBLICATIONS

Friedlan et al.; "Bullseye! When Fitts' Law Doesn't Fit"; CHI 98; Apr. 18-23, 1998; pp. 257-264; Los Angeles, California USA.

(Continued)

*Primary Examiner*—George A Bugg
*Assistant Examiner*—Sisay Yacob
(74) *Attorney, Agent, or Firm*—Ingrassia, Fisher & Lorenz, P.C.

(57) ABSTRACT

A proximity sensor device and method is provided that facilitates improved usability. Specifically, the proximity sensor device and method provides the ability for a user to easily select the type of adjustment inputted by the proximity sensor device. In one embodiment, the proximity sensor device includes an adjustment region and one or more start tabs adjacent to the adjustment region. The proximity sensor also includes a processor adapted to indicate adjustment of a first type responsive to sensed object motion originating in a first start tab and continuing in the adjustment region. Thus, a user can cause an adjustment of the first type by introducing an object proximate the first start tab, and moving the object from the first start tab and into the adjustment region.

29 Claims, 11 Drawing Sheets

U.S. PATENT DOCUMENTS

| | | | |
|---|---|---|---|
| 4,246,452 A | 1/1981 | Chandler | |
| 4,264,903 A | 4/1981 | Bigelow | |
| 4,386,346 A | 5/1983 | Levine | |
| 4,550,221 A | 10/1985 | Mabusth | |
| 4,571,149 A | 2/1986 | Soroka et al. | |
| 4,595,913 A | 6/1986 | Aubuchon | |
| 4,736,191 A | 4/1988 | Matzke et al. | |
| 4,758,830 A | 7/1988 | Levien et al. | |
| 4,777,328 A | 10/1988 | Talmage, Jr. et al. | |
| 4,951,036 A | 8/1990 | Grueter et al. | |
| 5,159,159 A | 10/1992 | Asher | |
| 5,272,470 A * | 12/1993 | Zetts | 345/173 |
| 5,305,017 A | 4/1994 | Gerpheide | |
| 5,392,388 A | 2/1995 | Gibson | |
| 5,432,531 A | 7/1995 | Calder et al. | |
| 5,438,331 A | 8/1995 | Gilligan et al. | |
| 5,452,413 A | 9/1995 | Blades | |
| 5,453,761 A | 9/1995 | Tanaka | |
| 5,455,906 A | 10/1995 | Usuda | |
| 5,485,171 A | 1/1996 | Copper et al. | |
| 5,491,706 A | 2/1996 | Tagawa et al. | |
| 5,508,703 A | 4/1996 | Okamura et al. | |
| 5,518,078 A | 5/1996 | Tsujioka et al. | |
| 5,543,590 A | 8/1996 | Gillespie et al. | |
| 5,543,591 A | 8/1996 | Gillespie et al. | |
| 5,546,106 A | 8/1996 | Walgers | |
| 5,565,658 A | 10/1996 | Gerpheide et al. | |
| 5,633,660 A | 5/1997 | Hansen et al. | |
| 5,650,597 A | 7/1997 | Redmayne | |
| 5,736,865 A | 4/1998 | Nelson et al. | |
| 5,748,185 A | 5/1998 | Stephan et al. | |
| 5,781,178 A | 7/1998 | Roehm et al. | |
| 5,808,602 A | 9/1998 | Sellers | |
| 5,825,352 A | 10/1998 | Bisset et al. | |
| 5,844,506 A | 12/1998 | Binstead | |
| 5,861,875 A | 1/1999 | Gerpheide | |
| 5,880,717 A * | 3/1999 | Chan et al. | 345/173 |
| 5,903,229 A * | 5/1999 | Kishi | 341/20 |
| 5,907,472 A | 5/1999 | Farahmandi et al. | |
| 5,914,465 A | 6/1999 | Allen et al. | |
| 5,933,102 A | 8/1999 | Miller et al. | |
| 5,941,122 A | 8/1999 | Nelson et al. | |
| 5,943,052 A | 8/1999 | Allen et al. | |
| 6,057,826 A | 5/2000 | Gaultier et al. | |
| 6,094,197 A * | 7/2000 | Buxton et al. | 715/863 |
| 6,137,427 A | 10/2000 | Binstead | |
| 6,163,312 A | 12/2000 | Furuya | |
| 6,259,432 B1 | 7/2001 | Yamada et al. | |
| 6,300,939 B1 | 10/2001 | Decker et al. | |
| 6,424,338 B1 | 7/2002 | Anderson | |
| 6,459,424 B1 | 10/2002 | Resman | |
| 6,473,069 B1 | 10/2002 | Gerpheide | |
| D469,109 S | 1/2003 | Andre et al. | |
| D472,245 S | 3/2003 | Andre et al. | |
| D457,149 S | 5/2003 | Arpe | |
| 6,570,557 B1 | 5/2003 | Westerman et al. | |
| 6,639,584 B1 | 10/2003 | Li | |
| 6,757,002 B1 * | 6/2004 | Oross et al. | 715/864 |
| 6,771,280 B2 | 8/2004 | Fujisaki et al. | |
| 6,781,576 B2 | 8/2004 | Tamura | |
| 6,788,288 B2 | 9/2004 | Ano | |
| 7,031,886 B1 | 4/2006 | Hargreaves | |
| 7,233,316 B2 | 6/2007 | Smith et al. | |
| 2002/0000978 A1 | 1/2002 | Gerpheide | |
| 2003/0043113 A1* | 3/2003 | Itoh | 345/156 |
| 2003/0048262 A1 | 3/2003 | Wu et al. | |
| 2003/0076301 A1 | 4/2003 | Tsuk et al. | |
| 2003/0076303 A1 | 4/2003 | Huppi | |
| 2003/0076306 A1* | 4/2003 | Zadesky et al. | 345/173 |
| 2003/0095096 A1 | 5/2003 | Robbin et al. | |
| 2003/0164818 A1 | 9/2003 | Miller-Smith | |
| 2004/0021694 A1 | 2/2004 | Doar | |
| 2004/0055446 A1 | 3/2004 | Robbin et al. | |
| 2004/0104898 A1 | 6/2004 | Badarneh | |
| 2004/0252109 A1 | 12/2004 | Trent et al. | |
| 2005/0052425 A1 | 3/2005 | Zadesky et al. | |
| 2005/0078182 A1* | 4/2005 | Lipsky et al. | 348/143 |
| 2005/0168489 A1* | 8/2005 | Ausbeck, Jr. | 345/672 |
| 2006/0028454 A1 | 2/2006 | Branton et al. | |
| 2006/0033721 A1* | 2/2006 | Woolley et al. | 345/173 |
| 2006/0161871 A1* | 7/2006 | Hotelling et al. | 715/863 |
| 2007/0097088 A1 | 5/2007 | Battles | |
| 2007/0097089 A1 | 5/2007 | Battles | |
| 2007/0097090 A1 | 5/2007 | Battles | |

FOREIGN PATENT DOCUMENTS

| | | |
|---|---|---|
| EP | 0 226 716 A2 | 7/1987 |
| EP | 0 880 091 A2 | 11/1998 |
| EP | 1079325 | 2/2001 |
| FR | 2702292 | 9/1994 |
| GB | 2050621 | 1/1981 |
| JP | 59-114628 | 7/1984 |
| JP | 59-119406 | 7/1984 |
| JP | 63-073415 | 4/1988 |
| JP | 06-243253 | 9/1994 |
| JP | 07-005969 | 1/1995 |
| JP | 07-121291 | 5/1995 |
| JP | 09-230993 | 9/1997 |
| JP | 11-105646 | 4/1999 |
| JP | 11-194863 | 7/1999 |
| JP | 11-194883 | 7/1999 |
| JP | 11-232026 | 8/1999 |
| JP | 2001-109571 | 4/2001 |
| JP | 2004-511849 | 4/2004 |
| JP | 2004-514203 | 5/2004 |
| WO | WO 94/17494 | 8/1994 |
| WO | WO 0 707 280 A2 | 4/1996 |
| WO | WO 01/78238 A1 | 10/2001 |
| WO | WO 02/31641 A | 4/2002 |

OTHER PUBLICATIONS

Kobayashi et al.; "Dynamic Soundscape: Mapping Time to Space for Audio Browsing"; CHI 97; Mar. 22-27, 1997; pp. 194-201; Atlanta, Georgia USA.

Smith et al.; "Generalized and Stationary Scrolling"; CHI Letters vol. 1,1; 1999; pp. 1-9; Asheville, North Carolina USA.

Evans et al.; "Tablet-Based Valuators that Provide One, Two, or Three Degrees of Freedom", Computer Graphics, vol. 15, No. 3; Aug. 1981; pp. 91-97.

European Search Report 03746701.6 dated Jun. 9, 2010.

* cited by examiner

PROXIMITY SENSOR DEVICE AND METHOD WITH ADJUSTMENT SELECTION TABS

FIELD OF THE INVENTION

This invention generally relates to electronic devices, and more specifically relates to proximity sensor devices.

BACKGROUND OF THE INVENTION

Proximity sensor devices (also commonly called touch pads or touch sensor devices) are widely used in a variety of electronic systems. A proximity sensor device typically includes a sensing region, often demarked by a surface, which uses capacitive, resistive, inductive, optical, acoustic and/or other technology to determine the presence, location and/or motion of one or more fingers, styli, and/or other objects. The proximity sensor device, together with finger(s) and/or other object(s), can be used to provide an input to the electronic system. For example, proximity sensor devices are used as input devices for larger computing systems, such as those found integral within notebook computers or peripheral to desktop computers. Proximity sensor devices are also used in smaller systems, including: handheld systems such as personal digital assistants (PDAs), remote controls, digital cameras, video cameras, communication systems such as wireless telephones and text messaging systems. Increasingly, proximity sensor devices are used in media systems, such as CD, DVD, MP3, video or other media recorders or players.

Many electronic devices include a user interface, or UI, and an input device for interacting with the UI (e.g., interface navigation). A typical UI includes a screen for displaying graphical and/or textual elements. The increasing use of this type of UI has led to a rising demand for proximity sensor devices as pointing devices. In these applications the proximity sensor device can function as a value adjustment device, cursor control device, selection device, scrolling device, graphics/character/handwriting input device, menu navigation device, gaming input device, button input device, keyboard and/or other input device.

One issue in the use of proximity sensor devices is the need to facilitate different types of adjustment of with one input device. For example, it is desirable for one proximity sensor device to provide cursor control, selection and scrolling, to give common examples. Previous devices and methods have typically required the use of separate controls, such as specified keys on a keyboard to change the type of adjustment that a user can input with proximity sensor. Other devices have required relatively complex gestures, such multiple taps to change the type adjustment that a user can input. While these solutions are acceptable in some applications, in other applications it is desirable to provide the user with the ability to change the type of adjustment with greater ease. Thus, there remains a continuing need for improvements in the ability of users to change the type of adjustments that can be input by a user.

BRIEF SUMMARY OF THE INVENTION

The present invention provides a proximity sensor device and method that facilitates improved usability. Specifically, the proximity sensor device and method provides the ability for a user to easily select the type of adjustment inputted by the proximity sensor device. In one embodiment, the proximity sensor device includes an adjustment region and one or more start tabs adjacent to the adjustment region. The proximity sensor also includes a processor adapted to indicate adjustment of a first type responsive to sensed object motion originating in a first start tab and continuing in the adjustment region. Thus, a user can cause an adjustment of the first type by introducing an object proximate the first start tab, and moving the object from the first start tab and into the adjustment region.

Furthermore, additional start tabs can be provided adjacent to the adjustment region, with the processor adapted to indicate adjustments of different types responsive to sensed object motion originating in those start tabs and continuing in the adjustment region. Finally, in some embodiments an additional type of adjustment can be indicated responsive to sensed object motion originating in the adjustment region. Thus, a user can cause many different types of adjustment based upon where object motion is originated proximate the proximity sensor device. Furthermore, the direction of object motion in the adjustment region can be further used to select the type of adjustment. This combination provides a flexible interface to the user, allowing the user to select the type of adjustment with relatively easy to perform object motions proximate the sensor.

In one detailed embodiment, the proximity sensor device is implemented on a media player, with multiple start tabs adjacent the adjustment region corresponding to types of adjustments commonly used on a media player. For example, start tabs implementing a change in volume, and a change in playback speed. In this embodiment, a user can cause a change in volume by originating object motion in the corresponding start tab, and continuing motion in the adjustment region. Likewise, a user can cause a change in playback status (e.g., fast forward or reverse) by originating object motion in the corresponding start tab. Additionally, the user can select the direction of adjustment (e.g., volume increase or volume decrease) based on the direction of object motion in the adjustment region. Thus, a user can easily increase or decrease the volume, fast forward or reverse play, all with the same proximity sensor device and relatively easy to perform object motions.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The present invention provides a proximity sensor device and method that facilitates improved usability. Specifically, the proximity sensor device and method provides the ability for a user to easily select the type of adjustment inputted by the proximity sensor device. In one embodiment, the proximity sensor device includes an adjustment region and one or more start tabs adjacent to the adjustment region. The proximity sensor also includes a processor adapted to indicate adjustment of a first type responsive to sensed object motion originating in a first start tab and continuing in the adjustment region. Furthermore, additional start tabs can be provided adjacent to the adjustment region, with the processor adapted to indicate adjustments of different types responsive to sensed object motion originating in those start tabs and continuing in the adjustment region. Thus, a user can cause many different types of adjustment based upon where object motion is originated proximate the sensor device. This combination provides a flexible interface to the user, allowing the user to select the type of adjustment with relatively easy to perform object motions proximate the sensor.

Figure 1:
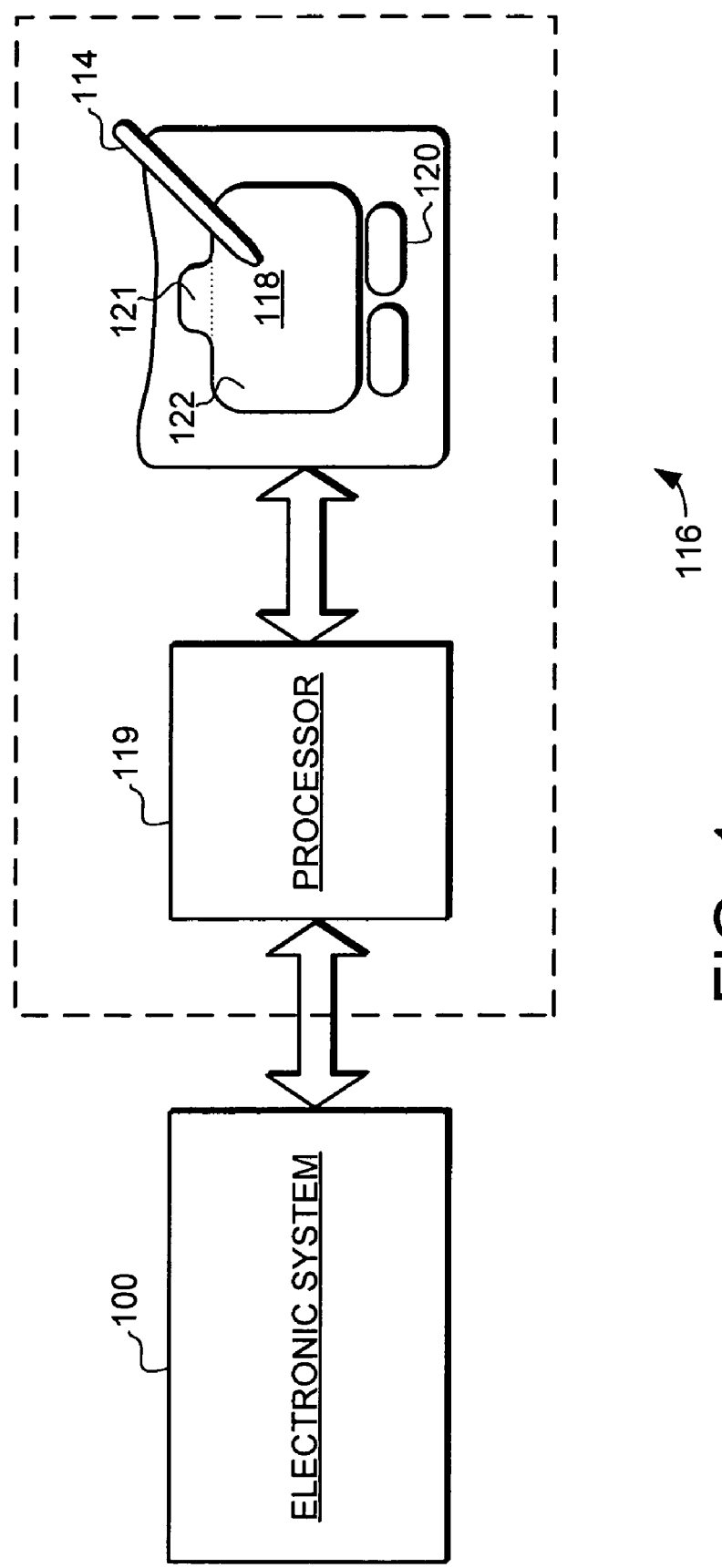
FIG. 1 is a block diagram of an exemplary system that includes a proximity sensor device in accordance with an embodiment of the invention.

Turning now to the drawing figures, FIG. 1 is a block diagram of an exemplary electronic system 100 that is coupled to a proximity sensor device 116. Electronic system 100 is meant to represent any type of personal computer, portable computer, workstation, personal digital assistant, video game player, communication device (including wireless phones and messaging devices), media device, including recorders and players (including televisions, cable boxes, music players, and video players), digital camera, video camera or other device capable of accepting input from a user and of processing information. Accordingly, the various embodiments of system 100 may include any type of processor, memory or display. Additionally, the elements of system 100 may communicate via a bus, network or other wired or wireless interconnection. The proximity sensor device 116 can be connected to the system 100 through any type of interface or connection, including I2C, SPI, PS/2, Universal Serial Bus (USB), Bluetooth, RF, IRDA, or any other type of wired or wireless connection to list several non-limiting examples.

Proximity sensor device 116 includes a processor 119 and a sensing region 118. Proximity sensor device 116 is sensitive to the position of a stylus 114, finger and/or other input object within the sensing region 118. "Sensing region" 118 as used herein is intended to broadly encompass any space above, around, in and/or near the proximity sensor device 116 wherein the sensor of the touchpad is able to detect a position of the object. In a conventional embodiment, sensing region 118 extends from the surface of the sensor in one or more directions for a distance into space until signal-to-noise ratios prevent object detection. This distance may be on the order of less than a millimeter, millimeters, centimeters, or more, and may vary significantly with the type of position sensing technology used and the accuracy desired. Accordingly, the planarity, size, shape and exact locations of the particular sensing regions 118 will vary widely from embodiment to embodiment.

In operation, proximity sensor device 116 suitably detects a position of stylus 114, finger or other input object within sensing region 118, and using processor 119, provides electrical or electronic indicia of the position to the electronic system 100. The system 100 appropriately processes the indicia to accept inputs from the user, to move a cursor or other object on a display, or for any other purpose.

In accordance with the embodiments of the invention, the sensing region 118 includes a start tab 121 and an adjustment region 122. The start tab 121 facilitates user selection of the type of adjustment that is performed with proximity sensor device. Specifically, by originating object motion proximate the start tab 121 and continuing in the adjustment region 122, a user can select the type of adjustment that occurs responsive to object motion proximate the proximity sensor device.

The proximity sensor device 116 can use a variety of techniques for detecting the presence of an object. As several non-limiting examples, the proximity sensor device 116 can use capacitive, resistive, inductive, surface acoustic wave, or optical techniques. In a common capacitive implementation of a touch sensor device a voltage is typically applied to create an electric field across a sensing surface. A capacitive proximity sensor device 116 would then detect the position of an object by detecting changes in capacitance caused by the changes in the electric field due to the object. Likewise, in a common resistive implementation a flexible top layer and a bottom layer are separated by insulating elements, and a voltage gradient is created across the layers. Pressing the flexible top layer creates electrical contact between the top layer and bottom layer. The resistive proximity sensor device 116 would then detect the position of the object by detecting the voltage output due to changes in resistance caused by the contact of the object. In an inductive implementation, the sensor might pick up loop currents induced by a resonating coil or pair of coils, and use some combination of the magnitude, phase and/or frequency to determine distance, orientation or position. In all of these cases the proximity sensor device 116 detects the presence of the object and delivers position information to the system 100. Examples of the type of technologies that can be used to implement the various embodiments of the invention can be found at U.S. Pat. No. 5,543,591, U.S. Pat. No 6,259,234 and U.S. Pat. No. 5,815,091, each assigned to Synaptics Inc.

Proximity sensor device 116 includes a sensor (not shown) that utilizes any combination of sensing technology to implement one or more sensing regions. For example, the sensor of proximity sensor device 116 can use arrays of capacitive sensor electrodes to support any number of sensing regions. As another example, the sensor can use capacitive sensing technology in combination with resistive sensing technology to support the same sensing region or different sensing regions. Depending on sensing technique used for detecting object motion, the size and shape of the sensing region, the desired performance, the expected operating conditions, and the like, proximity sensor device 116 can be implemented with a variety of different ways. The sensing technology can also vary in the type of information provided, such as to provide "one-dimensional" position information (e.g. along a sensing region) as a scalar, "two-dimensional" position information (e.g. horizontal/vertical axes, angular/radial, or any other axes that span the two dimensions) as a combination of values, and the like.

The processor 119, sometimes referred to as a proximity sensor processor or touch sensor controller, is coupled to the sensor and the electronic system 100. In general, the processor 119 receives electrical signals from the sensor, processes the electrical signals, and communicates with the electronic system. The processor 119 can perform a variety of processes on the signals received from the sensor to implement the proximity sensor device 116. For example, the processor 119 can select or connect individual sensor electrodes, detect presence/proximity, calculate position or motion information, and report a position or motion when a threshold is reached, and/or interpret and wait for a valid tap/stroke/character/button/gesture sequence before reporting it to the electronic system 100, or indicating it to the user. The processor 119 can also determine when certain types or combinations of object motions occur proximate the sensor. For example, the processor 119 can determine when object motion crosses from one region on the sensor (e.g., a start tab) to another region (e.g., an adjustment region), and can generate the appropriate indication in response to that motion.

In this specification, the term "processor" is defined to include one or more processing elements that are adapted to perform the recited operations. Thus, the processor 119 can comprise all or part of one or more integrated circuits, firmware code, and/or software code that receive electrical signals from the sensor and communicate with the electronic system 100. In some embodiments, the elements that comprise the processor 119 would be located with or near the sensor. In other embodiments, some elements of the processor 119 would be with the sensor and other elements of the processor 119 would reside on or near the electronic system 100. In this embodiment minimal processing could be performed near the sensor, with the majority of the processing performed on the electronic system 100.

Furthermore, the processor 119 can be physically separate from the part of the electronic system that it communicates with, or the processor 119 can be implemented integrally with that part of the electronic system. For example, the processor 119 can reside at least partially on a processor performing other functions for the electronic system aside from implementing the proximity sensor device 116.

Again, as the term is used in this application, the term "electronic system" broadly refers to any type of device that communicates with proximity sensor device 116. The electronic system 100 could thus comprise any type of device or devices in which a touch sensor device can be implemented in or coupled to. The proximity sensor device could be implemented as part of the electronic system 100, or coupled to the electronic system using any suitable technique. As non-limiting examples the electronic system 100 could thus comprise any type of computing device, media player, communication device, or another input device (such as another touch sensor device or keypad). In some cases the electronic system 100 is itself a peripheral to a larger system. For example, the electronic system 100 could be a data input or output device, such as a remote control or display device, that communicates with a computer or media system (e.g., remote control for television) using a suitable wired or wireless technique. It should also be noted that the various elements (processor, memory, etc.) of the electronic system 100 could be implemented as part of an overall system, as part of the touch sensor device, or as a combination thereof. Additionally, the electronic system 100 could be a host or a slave to the proximity sensor device 116.

In the illustrated embodiment the proximity sensor device 116 is implemented with buttons 120. The buttons 120 can be implemented to provide additional input functionality to the proximity sensor device 116. For example, the buttons 120 can be used to facilitate selection of items using the proximity sensor device 116. Of course, this is just one example of how additional input functionality can be added to the proximity sensor device 116, and in other implementations the proximity sensor device 116 could include alternate or additional input devices, such as physical or virtual switches, or additional proximity sensing regions. Conversely, the proximity sensor device 116 can be implemented with no additional input devices.

It should be noted that although the various embodiments described herein are referred to as "proximity sensor devices", "touch sensor devices", "proximity sensors", or "touch pads", these terms as used herein are intended to encompass not only conventional proximity sensor devices, but also a broad range of equivalent devices that are capable of detecting the position of a one or more fingers, pointers, styli and/or other objects. Such devices may include, without limitation, touch screens, touch pads, touch tablets, biometric authentication devices, handwriting or character recognition devices, and the like. Similarly, the terms "position" or "object position" as used herein are intended to broadly encompass absolute and relative positional information, and also other types of spatial-domain information such as velocity, acceleration, and the like, including measurement of motion in one or more directions. Various forms of positional information may also include time history components, as in the case of gesture recognition and the like. Accordingly, proximity sensor devices can appropriately detect more than the mere presence or absence of an object and may encompass a broad range of equivalents.

In the embodiments of the present invention, the proximity sensor device 116 is adapted to provide the ability for a user to easily cause adjustments in an electronic system using a proximity sensor device 116 as part of a user interface. For example, it can be used to facilitate user interface navigation, such as scrolling, panning, menu navigation, cursor control, and the like. As another example, it can be used to facilitate value adjustments, such as changing a device parameter, including visual parameters such as color, hue, brightness, and contrast, auditory parameters such as volume, pitch, and intensity, operation parameters such as speed and amplification. The proximity sensor device 116 can also be used for control of mechanical devices, such as in controlling the movement of a machine. To facilitate adjustment, the embodiments of the present invention provide a proximity sensor device 116 that is adapted to indicate adjustment of a first type responsive to sensed object motion originating in a first start tab 121 and continuing in the adjustment region 122. Thus, a user can cause an adjustment of the first type by introducing an object proximate the first start tab, and moving the object from the first start tab 121 and into the adjustment region 122. This allows a user to select the type of adjustment that is entered with the proximity sensor device 116 using a relatively simple gesture.

It should also be understood that while the embodiments of the invention are described herein the context of a fully functioning proximity sensor device, the mechanisms of the present invention are capable of being distributed as a program product in a variety of forms. For example, the mechanisms of the present invention can be implemented and distributed as a proximity sensor program on a computer-readable signal bearing media. Additionally, the embodiments of the present invention apply equally regardless of the particular type of signal bearing media used to carry out the distribution. Examples of signal bearing media include: recordable media such as memory cards, optical and magnetic disks, hard drives, and transmission media such as digital and analog communication links.

Figure 2:
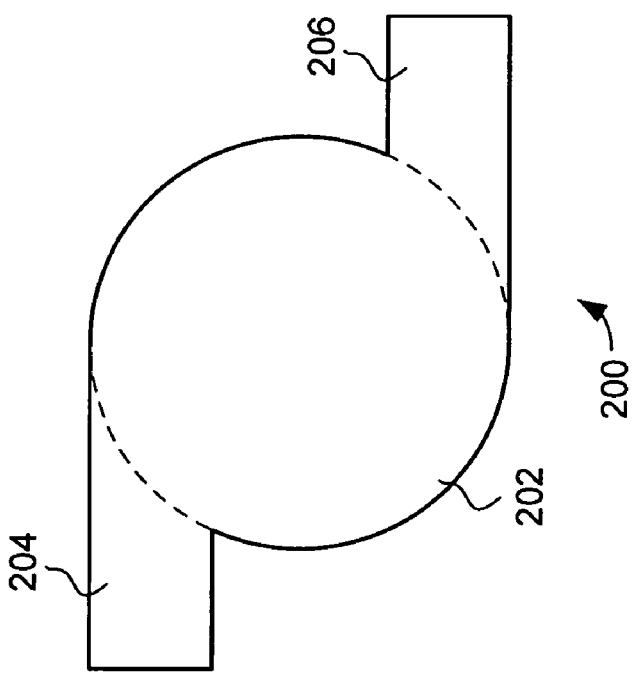

Turning now to FIG. 2, an exemplary proximity sensor device 200 is illustrated. The proximity sensor device 200 includes an adjustment region 202, a first start tab 204 and a second start tab 206 adjacent to and extending from the adjustment region 202. Thus, FIG. 2 illustrates a proximity sensor device 200 that can be used to indicate adjustments of different types responsive to sensed object motion originating in start tabs 204 and 206 and continuing in the adjustment region 200. Additionally, the type of adjustment can be indicated responsive to object motion originating in the adjustment region 202. Thus, a user can cause many different types of adjustment with the proximity sensor device 200 based upon where object motion is originated. Furthermore, the direction of object motion in the adjustment region 202 can be further used to select the type of adjustment. This combination provides a flexible interface to the user, allowing the user to select the type of adjustment with relatively easy to perform object motions proximate the sensor device 200.

The proximity sensor device 200 can be implemented to recognize a variety of gestures as originating in a start tab and continuing in the adjustment region such that the type of adjustment is selected. For example, a user can make an initial placement of the object on the surface of the proximity sensor device in the start tab. Then, the user can slide the object along the surface of the proximity sensor from the start tab and into the adjustment region.

It should be noted that while FIG. 2 illustrates a proximity sensor device 200 with a circular adjustment region 202, and two semi-rectangular start tabs 204 and 206, that this is just one example of the variety of shapes that can be implemented. For example, other curvilinear, rectilinear, and combination shapes can be used. As will be illustrated in other examples below, these shapes include polygons such as rectangles.

The proximity sensor device 200 can be used to facilitate a wide variety of different inputs to an electronic system by a user. In this specification the type of inputs to the electronic system generated are generally referred to as "adjustments". One example of an adjustment that can be performed with the proximity sensor device 200 is user interface navigation. User interface navigation can comprise a variety interface activities, such as horizontal and vertical scrolling, dragging, selecting among menu options, stepping through a list, etc. In all these cases the user interface can be selected using a corresponding start tab by originating object motion in that start tab. For example, originating object motion in a start tab corresponding to scrolling down. In other embodiments the originating in a start tab can cause panning to the left, or zooming in, etc. One specific type of user interface navigation is scrolling. In general, scrolling is defined as causing a display window to move its viewing region within a larger space of data. For example, to move within a large document to display a different portion of the document. Scrolling also can include moving a selection point within a list, menu, or other set of data.

It should also be noted that scrolling and other actions can be combined with selection. For example, the proximity sensor device 200 can be implemented to cause scrolling in a first way responsive to object motion originating in a corresponding start tab, and then to cause selection when the object motion proximate the sensor ceases (e.g., when the object stops moving or when the object is lifted from the sensor). Thus, as one specific example, a user can easily scroll through a large list of elements with object motion, and then the user can select the desired element by lifting the object, a relatively easy to perform combination of gestures.

Another example of a type of adjustment is a value adjustment. In a value adjustment the proximity sensor device is used to change a value on the system. For example, by increasing or decreasing the quantity of a selected field on the device. Alternatively, the value adjustment may relate to a functional parameter, such as increasing volume or contrast or aiming a camera to the right.

In some cases it will be desirable to facilitate additional user changing of the adjustment. Thus, in addition to selecting the type of adjustment with a corresponding start tab, the user can change the manner (or way) of adjustment, such as to change between scrolling up and down, or to change between panning left or right based on some other action. For example, it may also be desirable to allow the user to change a factor associated with the manner or way of adjustment, such as the speed of adjustment. The proximity sensor device 200 can be implemented to cause changing of adjustment responsive to a variety of different actions by the user. For example, it can be implemented such that a user can cause a change in adjustment using other keys, buttons, or input devices on the device. Additionally, the proximity sensor device 200 can be implemented to recognize special gestures proximate to proximity sensor device 200 to select and change the adjustments. In all these cases the proximity sensor device 200 can be implemented to allow a user to change the way or type of adjustment as needed.

Figure 3:
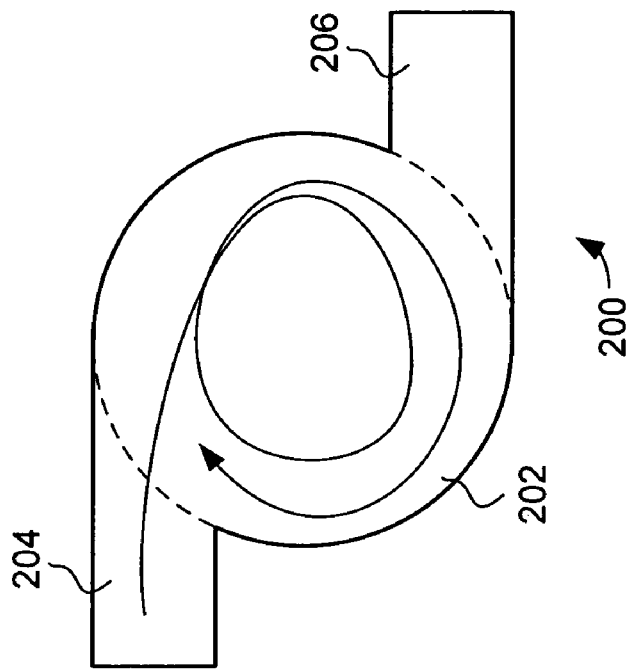
FIGS. 2-9 are schematic views of a proximity sensor device in accordance with embodiments of the invention.

Turning now to FIG. 3, FIG. 3 illustrates a first path of object motion a user can perform on the proximity sensor device 200 to cause an adjustment of a first type. In this example, object motion originates in start tab 204 and continues in adjustment region 202. Additionally, in this example, the motion continuing in the adjustment region 202 follows a clockwise direction. This combination of gestures is relatively easy to perform, and can be used to cause an adjustment of a first type on the electronic device associated with the proximity sensor device 200. For example, to increase in playback volume in a media player, or scrolling up a document in a personal digital assistant (PDA).

Figure 4:
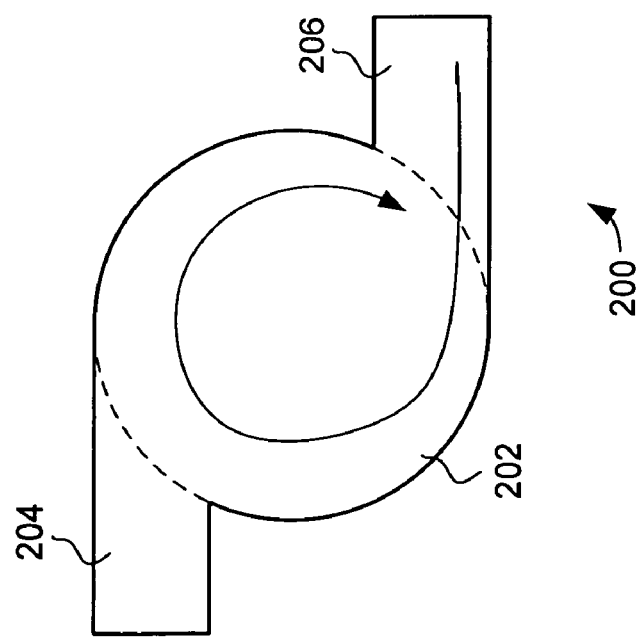

Turning now to FIG. 4, FIG. 4 illustrates a second path of object motion a user can perform on the proximity sensor 200 to cause adjustment of a second type. In this example, object motion originates in start tab 206 and continues in adjustment region 202. Additionally, in this example, the motion continuing in the adjustment region 202 follows a clockwise direction. This combination of gestures can be used to cause an adjustment of a second type on the electronic device. For example, to fast forward in a media player, or pan right in a document on a PDA. Thus, the two start tabs 204 and 206 provide the user with the ability to cause two different types of adjustments using the proximity sensor device 200.

Figure 5:
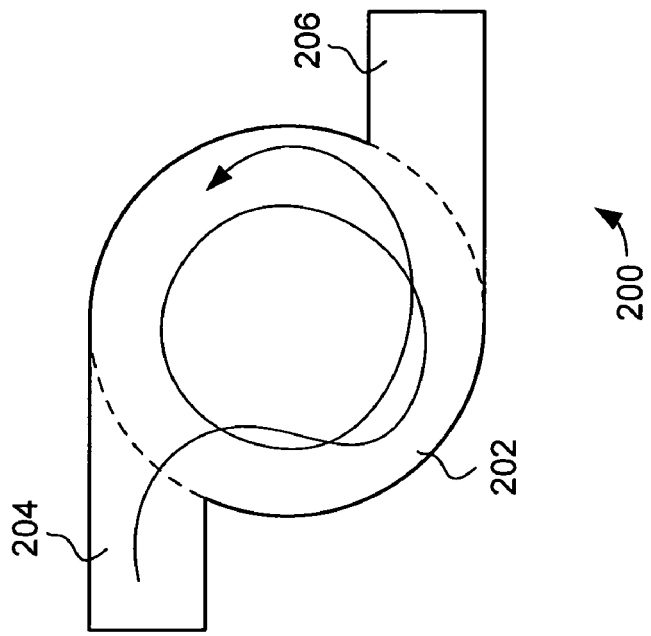

Additionally, the direction of motion in the adjustment region 202 can be used to select the type of adjustment. Turning now to FIG. 5, illustrates a third path of object motion a user can perform on the proximity sensor device 200 to cause an adjustment of a third type. In this example, object motion again originates in start tab 204 and continues in adjustment region 202. However, in this example, the motion continuing in the adjustment region 202 follows a counter-clockwise direction. This allows a user to cause a third type of adjustment. Typically, this third type of adjustment would correspond to the opposite of first type illustrated in FIG. 3. For example, to decrease playback volume in a media player, or scrolling down a document in a PDA.

Figure 6:
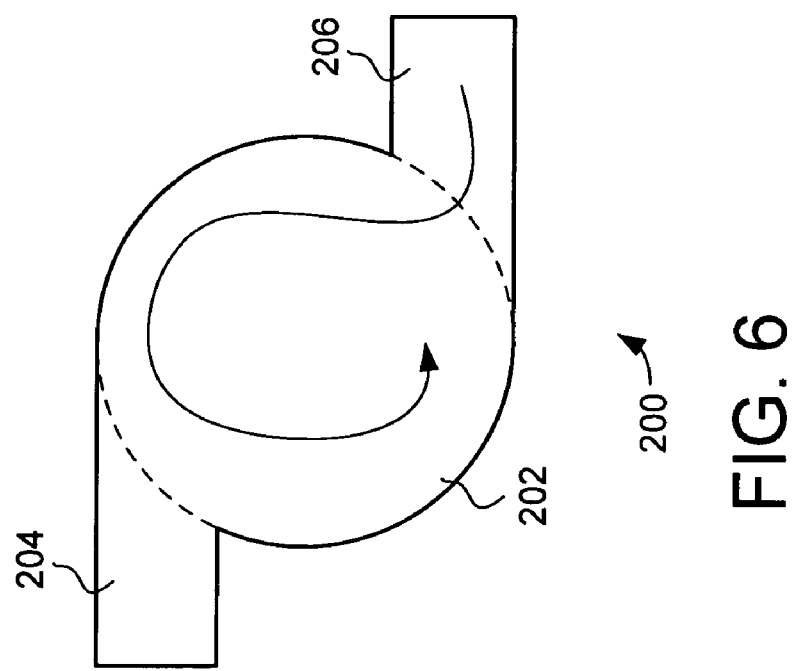

Turning now to FIG. 6, illustrates a fourth path of object motion a user can perform on the proximity sensor device 200 to cause an adjustment of a fourth type. In this example, object motion again originates in start tab 206 and continues in adjustment region 202. However, in this example, the motion continuing in the adjustment region 202 follows a counter-clockwise direction. This allows a user to cause a fourth type of adjustment. Typically, this fourth type of adjustment would correspond to the opposite of the second type illustrated in FIG. 4. For example, to reverse play in a media player, or pan left in a document on a PDA.

It should be noted that in most implementations, the adjustment caused by originating object motion in a start tab (204 or 206) and continuing in the adjustment region 202 would continue as long as object motion in the adjustment region continues. Thus, the adjustment will continue until stopped by the user, or when end of the adjustment range is reached (e.g., maximum volume, or scrolled to the top of the document).

Figure 7:
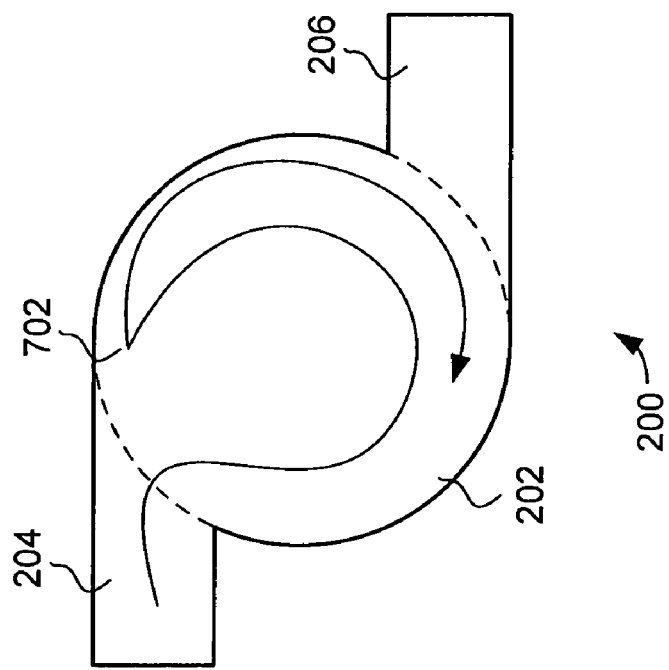

Additionally, by switching directions of the object motion, the user can change the type of the adjustment in mid-gesture. Turning now to FIG. 7, FIG. 7 illustrates a path of object motion a user can perform on the proximity sensor device 200 to cause two consecutive types of adjustment. In this example, object motion again originates in start tab 204 and continues in adjustment region 202 in a counter-clockwise direction. This allows a user to cause a first type of adjustment. Then, at point 702, the user switches the direction of object motion, causing the object motion to proceed in a clockwise direction. This allows the user to stop the first type of adjustment, and immediately begin a second type of adjustment, without having to lift the object and restart the gesture. Such a switch is useful a variety of situations. For example, when a user is scrolling up a document (e.g., using counter-clockwise object motion) and passes the desired point, the user can immediately stop scrolling up and start scrolling down by switching directions (e.g., switching to clockwise object motion). As another example, when a user is decreasing the volume and goes below the desired level, the user can immediately increase the volume by switching directions. Thus, in both cases a user that overshoots a desired adjustment can easy reverse the adjustment to reach the desired level.

Figure 9:
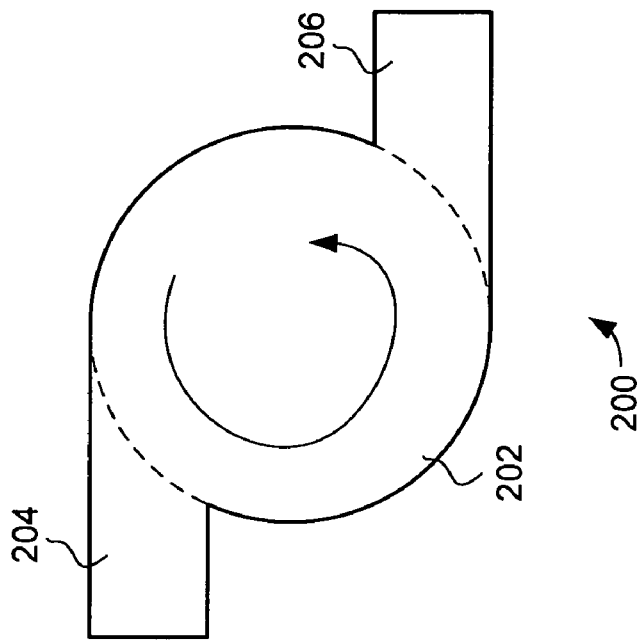
Figure 8:
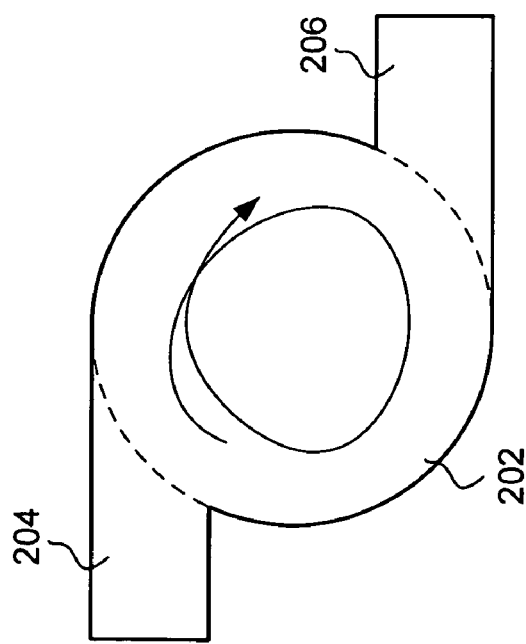

In addition to selecting the type of adjustment using a start tab, the proximity sensor device can be implanted to select a different type of adjustment responsive to object motion originating in the adjustment region. Turning now to FIG. 8, the proximity sensor device 200 is illustrated with object motion originating in the adjustment region 202 and continuing clockwise in the adjustment region 202. Likewise, in FIG. 9, the proximity sensor device 200 is illustrated with object motion originating in the adjustment region 202 and continuing counter-clockwise in the adjustment region 202. Thus, two more types of adjustment can be supported in the proximity sensor device 200, allowing a user to easily select from six types of adjustments based on the originating location of object motion and the direction of object motion in the adjustment region 202. These adjustments can be selected with relatively simple, easy to perform gestures, and are thus suitable for a wide variety of applications.

Figure 10:
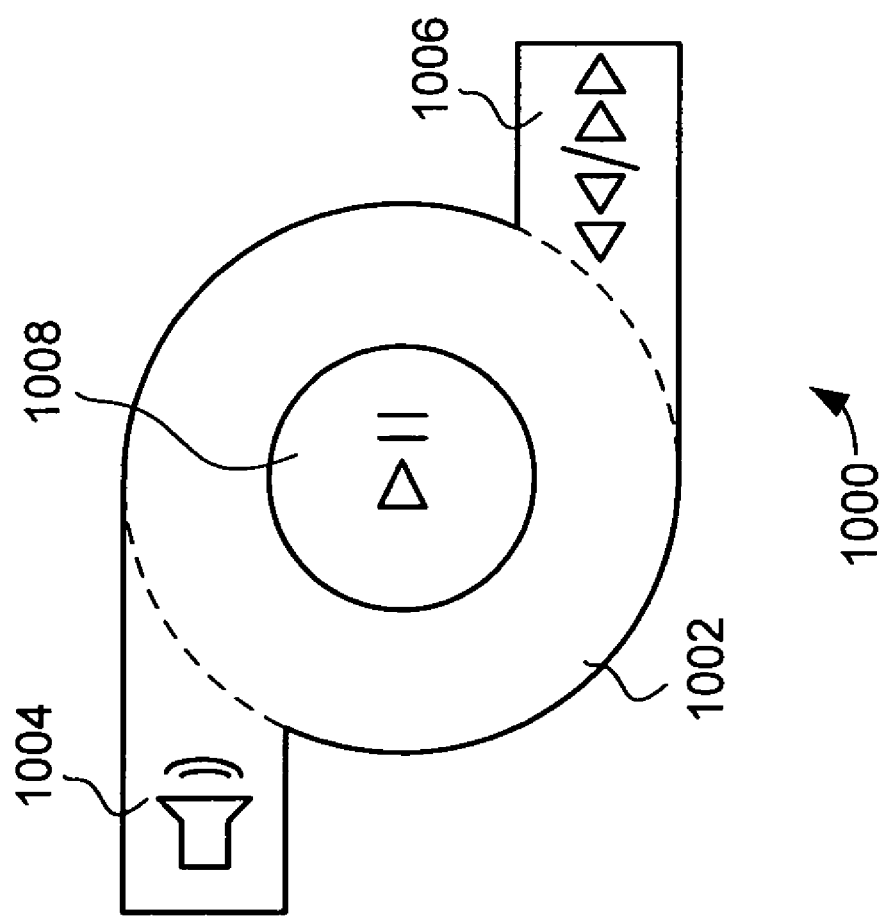
FIGS. 10-14 are schematic views of a proximity sensor device in accordance with embodiments of the invention.

Turning now to FIG. 10, a specific embodiment of a proximity sensor device 1000 is illustrated. This embodiment, like the embodiments in FIGS. 2-9, includes an adjustment region 1002, a first start tab 1004 adjacent to, and extending from, the adjustment region 1002, and a second start tab 1006, adjacent to, and extending from the adjustment region 1002. Additionally, the proximity sensor device 1000 includes a center adjustment region 1008. In the illustrated embodiment, several of the various regions include icons that designate the type of adjustments that can be performed using those regions. Thus, start tab 1004 includes an icon that indicates it can be used to change the volume. A user could thus cause a change in volume with object motion originating in start tab 1004 and continuing in adjustment region 1002, as was illustrated in FIGS. 3 and 5. Likewise, start tab 1006 includes an icon that indicates it can be used to for reverse and fast-forward. A user could thus cause a fast-forward and/or reverse with object motion originating in start tab 1006 and continuing in adjustment region 1002, as was illustrated in FIGS. 4 and 6. Finally, the center adjustment region 1008 can be "tapped" or otherwise activated to switch the playback status between playing and pausing. The proximity sensor device 1000 thus allows a user to selectively control the volume and playback of the associated device using easy to perform gestures, and can thus be used to provide effective control for a vide variety of media players, including audio and video players. It should be noted that instead of proximity sensor electrodes being used for region 1008, a mechanical button, a single capacitive button, or other device could be used to implement the center adjustment region.

The icons used to designate the type of adjustment can be implemented in variety of ways. For example, the icons could be printed on the surface of the proximity sensor device using any suitable printing technique. In other implementations the icons are molded into the top surface of the proximity sensor device. In other implementations the icons are dynamically created using touch screen technology, such as that described in U.S. Pat. No. 6,885,318 entitled "Text entry method and device therefore". This implementation has the advantage of providing the ability to dynamically change the icons displayed on the proximity sensor device for different applications.

Figure 11:
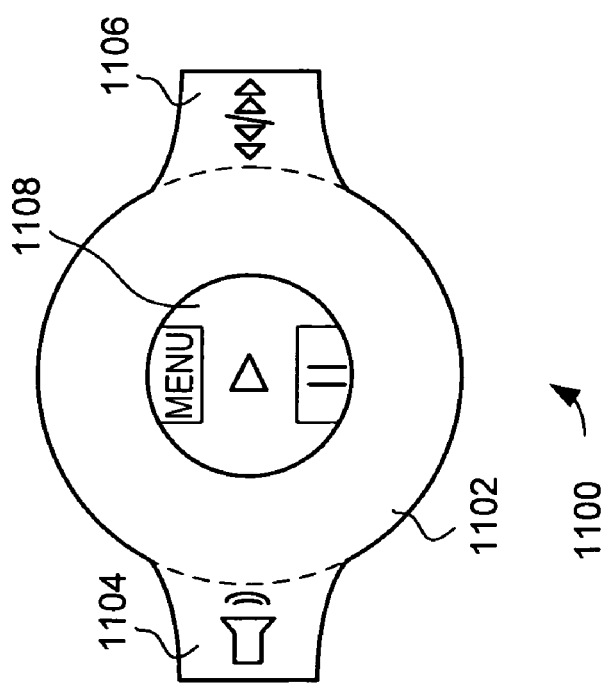

Turning now to FIG. 11, a second specific embodiment of a proximity sensor device 1100 is illustrated. This embodiment, like the embodiments in FIGS. 2-10, includes an adjustment region 1102, a first start tab 1104 adjacent to, and extending from the adjustment region 1102, and a second start tab 1106, adjacent to, and extending from the adjustment region 1102. Additionally, the proximity sensor device includes a center adjustment region 1108. In this embodiment, the two start tabs 1104 and 1106 are on direct opposite sides of the adjustment region 1102. Additionally, the center adjustment region provides defined areas for playing, pausing and menu control. In this embodiment, activating the menu icon can display a menu of other available options, such as a control menu, or an available playlist for a media player. The proximity sensor device 1100, like proximity sensor device 100 illustrated in FIG. 10, thus allows a user to selectively control the volume and playback of the associated device using easy to perform gestures, and can thus be used to provide effective control for a wide variety of media players, including audio and video players.

Figure 12:
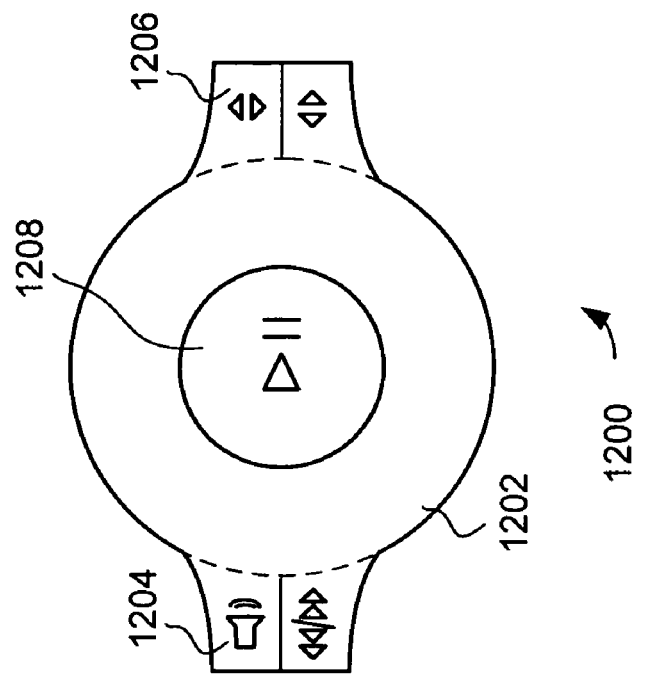

Turning now to FIG. 12, a third specific embodiment of a proximity sensor device 1200 is illustrated. This embodiment, like the embodiments in FIGS. 2-11, includes an adjustment region 1202, a first start tab 1204, a second start tab 1206 and a center adjustment region 1208. In this embodiment, the two start tabs 1204 and 1206 are each divided, and thus each of the two start tabs 1204 and 1206 can be used to indicate two different types of adjustments (in addition to the two types which can be indicated by the two different directions of object motion in the adjustment region 1202). Specifically, the start tab 1204 is divided into an upper region for volume and a lower region for fast-forward and reverse. Object motion originating in the upper region of start tab 1204 can thus be used for volume control, while object motion originating in the lower region can thus be used for playback control. Likewise, the second start tab 1206 is divided into an upper region for scrolling up and down, and a lower region for panning left and right. Object motion originating in the upper region of start tab 1206 can thus be used for scrolling up and down, while object motion originating in the lower region can thus be used for panning left and right. Additionally, the center adjustment region 1208 provides defined areas for playing and pausing.

Figure 13:
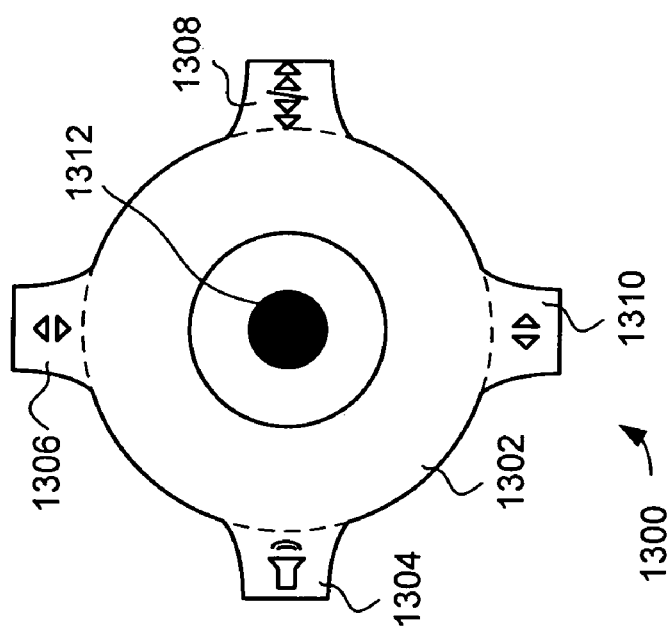

While FIGS. 2-12 have illustrated proximity sensor devices with two start tabs, this is merely exemplary and the proximity sensor devices can be implemented a wide variety in the number of start tabs. Turning now to FIG. 13, a proximity sensor device 1300 is illustrated that includes an adjustment region 1302, a first start tab 1304, a second start tab 1306, a third start tab 1308, and a fourth start tab 1310. The first start tab 1304 is implemented for volume control. The second start tab 1306 is implemented for scrolling up and down. The third start tab 1308 is implemented for fast-forward and reverse. Finally, the fourth start tab 1310 is implemented for panning left and right. In each case, object motion originating a start tab enables adjustment of the corresponding type.

The proximity sensor device 1300 also includes a touch stick 1312 at the center of the adjustment region 1302. The touch stick 1312 provides additional functionality to the user. For example, the touch stick 1312 can be implemented for cursor control. This allows the proximity sensor device 1300 to provide cursor control in the same device that provides for the various types of adjustments.

The touch stick 1312 can be implemented with a variety of different technologies. For example, it can be implemented using the technologies described in U.S. Pat. No. 6,642,857 entitled "Capacitive Pointing Stick" and/or U.S. Pat. No. 6,975,302 entitled "Isometric Joystick Usability".

Figure 14:
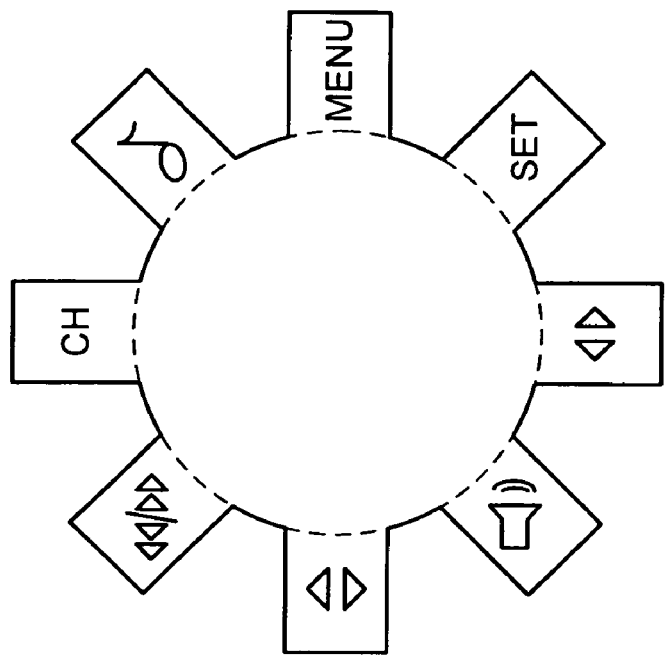

Again, the number of start tabs illustrated is merely exemplary. Turning now to FIG. 14, a proximity sensor device 1400 is illustrated that includes seven start tabs surrounding an adjustment region is illustrated. In this embodiment, start tabs for panning, volume control, scrolling, fast-forward/reverse, channel, playlist, menu, and settings are included. Each start tab can be used to cause a corresponding adjustment by originating object motion in the start tab and continuing in the adjustment region.

Figure 15:
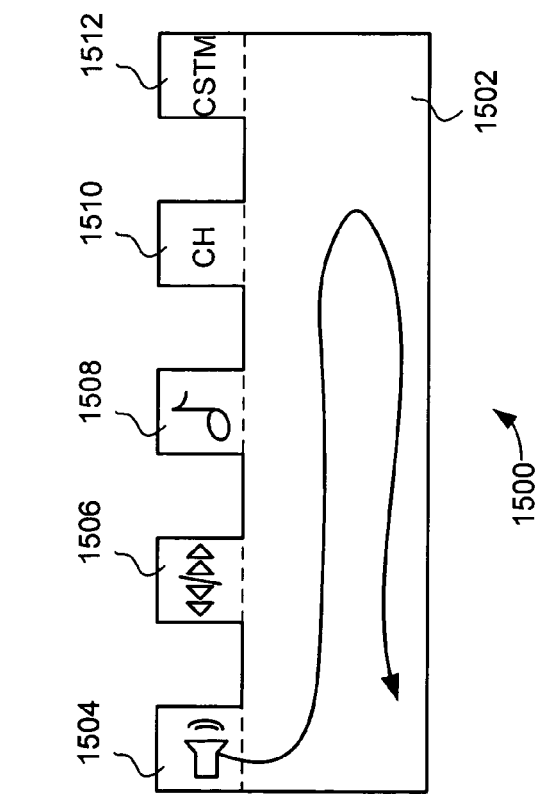

It should also be noted that while FIGS. 2-14 illustrate proximity sensor devices with circular shaped adjustment regions, that this is just one example of the variety of shapes that can be implemented. Turning now to FIG. 15, a proximity sensor device 1500 includes a rectangular adjustment region 1502, and five start tabs 1504, 1506, 1508, 1510, and 1512. In the illustrated embodiment, the five start tabs are implemented for adjustments in volume, playback, playlist, channel and a custom adjustment respectively. Thus, each start tab can be used to indicate adjustments of a different type responsive to sensed object motion originating in the start tab and continuing in the adjustment region 1502. As one example that is illustrated, a user can cause an adjustment in volume by originating object motion in start tab 1504 and continuing in the adjustment region 1502.

Figure 16:
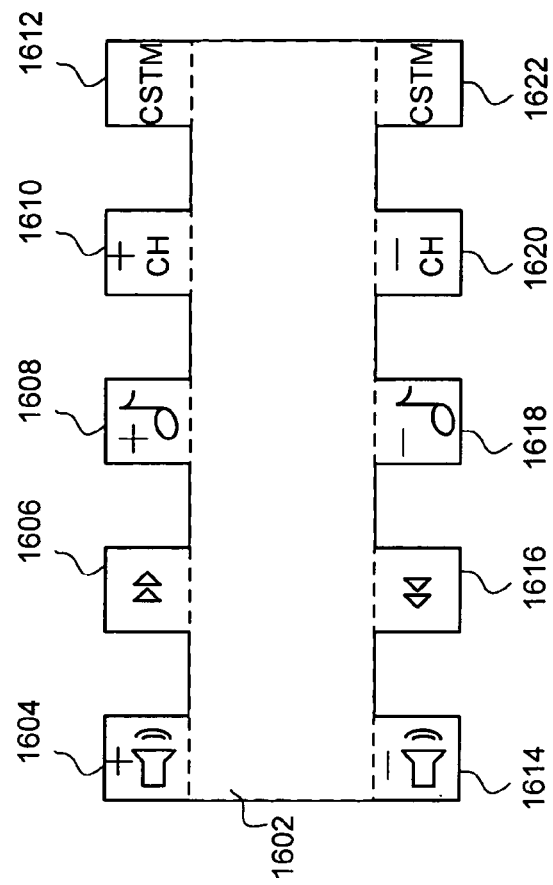
FIGS. 15-16 are schematic views of a proximity sensor device in accordance with embodiments of the invention.

In some applications it will be desirable to include multiple start tabs for related types of adjustments. Turning now to FIG. 16, a proximity sensor device 1600 is illustrated that includes a rectangular adjustment region 1602 and ten start tabs 1604, 1606, 1608, 1610, 1612, 1614, 1616, 1618, 1620 and 1622. In this embodiment, several of the start tabs are for related types of adjustment. For example, start tab 1604 can be used to increase volume, while start tab 1614 can be used to decrease volume. Likewise, start tab 1606 can be used to fast-forward, while start tab 1616 can be used to reverse. Thus, a user can easily select a type of adjustment, including selecting the direction (or "way") of a type of adjustment by originating object motion in the appropriate start tab and continuing in the adjustment region 1602.

In one additional variation on the embodiments illustrated in FIGS. 15 and 16, these and other embodiments can be implemented to indicate adjustment in a first way responsive to object motion in either and both of two opposite directions along a path proximate the adjustment region (i.e. indicate the adjustment in the first way responsive to a portion of the object motion in a first direction as well as indicate the adjustment in the same first way responsive to a portion of the object motion in a second direction opposite the first direction). This facilitates use of the proximity sensor device by a user to indicate continuing adjustments to an electronic device by moving an object to generate the object motion. It is particularly useful for indicating continuing adjustments, for example, to facilitate scrolling through a large document or a large list of items. In those cases the type of adjustment can be selected by originating motion in the appropriate start tab and continuing in the adjustment region, with continued adjustment indicated by moving the object back and forth along path in the adjustment region. Specifically, continuing adjustment in a first way (e.g., in a specific direction) can be indicated responsive to object motion in a first of two opposite directions along a path proximate the adjustment region, and responsive to object motion in a second of the two opposite directions along the path proximate the first adjustment region.

This type of implementation if effective for facilitating a variety of different types of adjustment. For example, this allows a user to select scrolling and continue to scroll through a large document without requiring the user to perform a more complex gesture on the proximity sensor device. More information regarding how an adjustment region can be implemented in this manner can be found at U.S. patent application Ser. No. 11/431,345, entitled Proximity Sensor Device and Method with Improved Indication of Adjustment", filed May 9, 2006.

Figure 17:
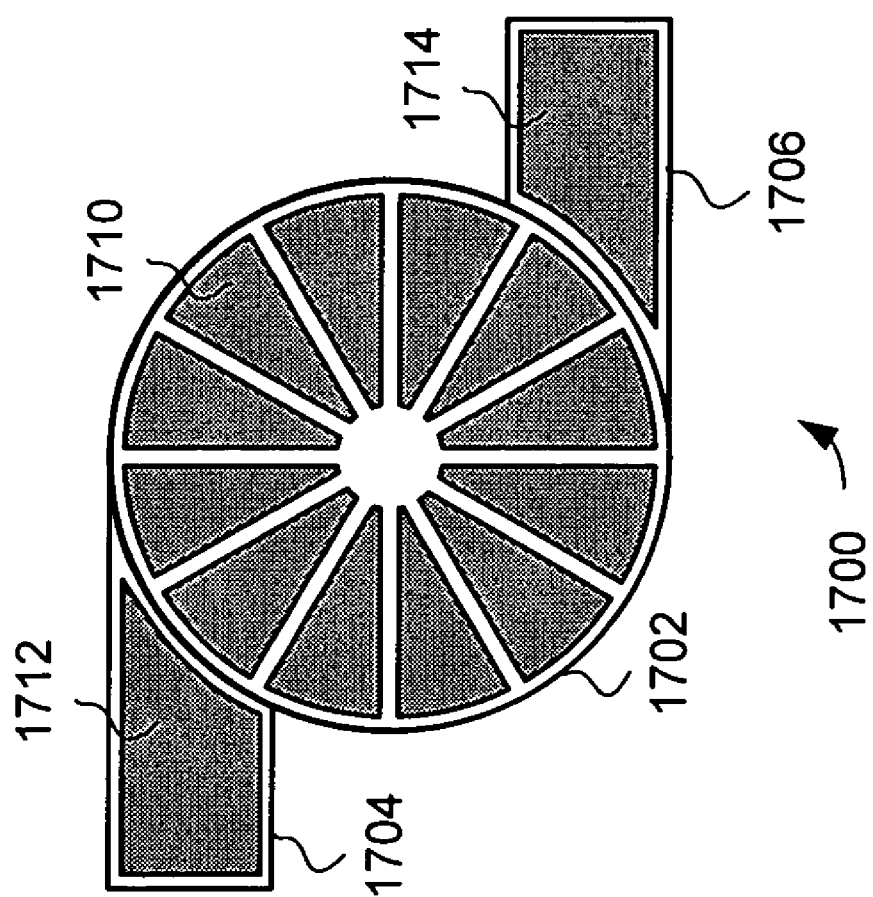
FIG. 17 is a schematic view of a proximity sensor device illustrating an electrode configuration in accordance with embodiments of the invention.

As stated above, the various embodiments of proximity sensor devices can use a variety of techniques for detecting the presence of an object. It should be noted that regardless of the technique used, the start tabs are implemented as part of the overall proximity sensor device such that object motion from the start tab to the adjustment region can be reliably detected and interpreted. In a suitable capacitive implementation of a proximity sensor device, a plurality of electrodes are arranged and configured to create an electric field across a sensing surface. The position of an object would then be determined by detecting changes in capacitance caused by the changes in the electric field due to the object. These various electrodes can be arranged in a variety of suitable configurations. Turning now to FIG. 17, an exemplary proximity sensor device 1700 is illustrated that uses a plurality of electrodes for capacitive sensing of object location. In the illustrated embodiment, the proximity sensor device 1700 includes an adjustment region 1702, a first start tab 1704 and a second start tab 1706. In the adjustment region 1702, a plurality of electrodes 1710 are arranged together in a circle. Likewise, an electrode 1712 defines the start tab 1704, and an electrode 1714 defines the start tab 1706. During operation, the electrodes 1710, 1712 and 1714 are used together to determine object location, and can thus be used to determine when object motion originates in a start tab and continues in the adjustment region. Thus, all the electrodes are configured together to function as part of an overall proximity sensor to determine when adjustments of selected types are entered. Again, this is just one example of the type of the techniques and electrode configurations that can be used.

Figure 18:
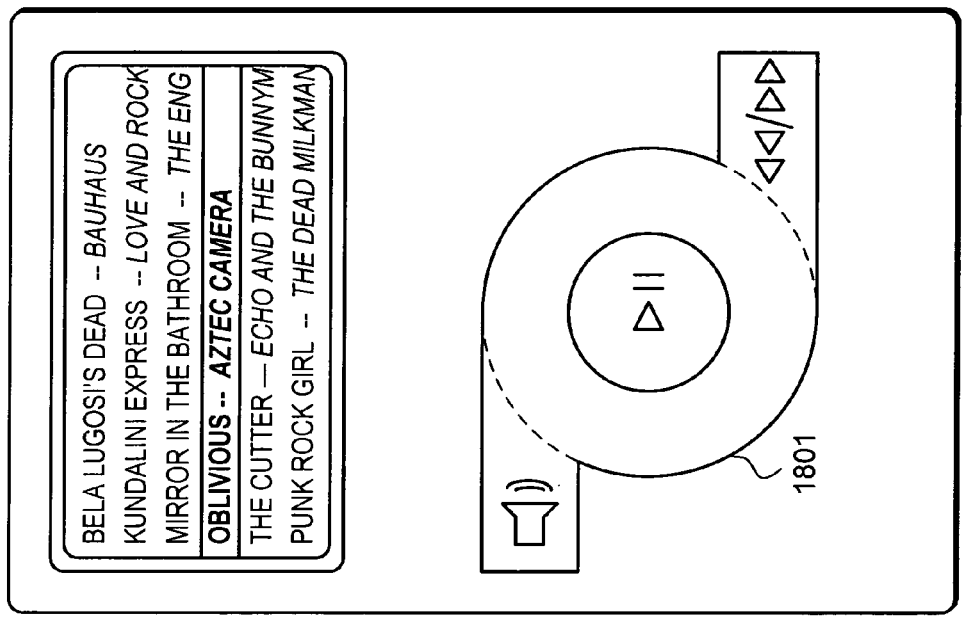
FIG. 18 is a schematic view a media player including a proximity sensor device in accordance with embodiments of the invention.

As stated above, the proximity sensor device and method can be implemented in a variety of different types of electronic systems, including computers, personal digital assistants, video game players and communication devices. Additionally, the proximity sensor device can be implemented as part of a media player. Turning now to FIG. 18, a media player 1800 is illustrated that includes a proximity sensor device 1801. The proximity sensor device 1801 includes a first start tab for volume control and a second start tab for fast-forward and/or reverse. Additionally, the proximity sensor device 1801 includes a center adjustment region for switching the playback status between playing and pausing. In addition to these uses, the proximity sensor device 1801 can be used to scroll through the list of media to search and select media for playing. Thus, the proximity sensor device 1801 allows a user to selectively control the volume and playback of the associated device using easy to perform gestures, and can thus be used to provide effective control for a vide variety of media players, including audio and video players.

Several different techniques can be used to improve the usability of proximity sensor devices in accordance with the embodiments of the invention. For example, in some implementations it will be desirable to not indicate adjustment responsive to signals representing very small or sudden amounts of sensed object motion. Small amounts of sensed object motion can inadvertently result from attempts by the user to pause in the sensing region. In these cases small mounts of motion caused by bodily tremors or shaking in the environment could be interpreted as intended object motion. In addition, a user may reduce or stop paying attention to object motion while examining items on the list, and accidentally drift the object motion. Further, there may also be accidental input from the user accidentally brushing against the sensing region (these are likely to result in sudden amounts of sensed object motion, large or small). Likewise, electronic noise from sources such as power supply(ies), EMI, etc. can cause spurious, incorrect signals hinting at object motion that do not exist. In all these cases it can be desirable to not indicate adjustment responsive to these signals indicating small or sudden amounts of sensed object motion to avoid causing inadvertent adjustment when no such adjustment is intended by the user.

One way to address this issue is with the use of filters, such as with the use of threshold values and by gauging if the object motion is beyond one or more threshold levels. Thresholds may be maximum or minimum bounds, such that object motion may be "beyond" a maximum threshold when it is above the threshold level and "beyond" a minimum threshold when it is below the threshold level. For example, by comparing the sensed object motion to a threshold, the system can ignore sensed levels of object motion that are below the threshold and not indicate adjustment. In this case, the threshold can be set to filter out object motion less than what is likely to be indicative of intended input, and the proximity sensor device will not consider amounts of sensed object motion below that threshold to be indicative of object motion. Alternatively, the system can ignore sensed levels of object motion that are above a threshold and not indicate adjustment. In this alternate case, the threshold can be set to filter out object motion greater than what is likely to be indicative of intended input, and the proximity sensor device will not consider amounts of sensed object motion above the threshold to be indicative of object motion. A variety of thresholds can be used, separately or in combination. For example, the system can require that the object motion travel a minimum distance proximate/in the sensing region before responding with adjustment, but accept object motion traveling less than that minimum distance threshold as other input. It should be noted that while object motion below the distance threshold would not generate any indications of adjustment, it could still be used to trigger other input (e.g. selection). Further constraints can be imposed, such as to require that a minimum distance or a maximum distance be traveled within a predetermined amount of time. The threshold may also alternatively be on another characteristic of the object motion, such as requiring that the speed of the object motion be beyond a certain threshold and/or below a particular threshold before generating an indication of an adjustment. Thresholds may also be combined, such that an object motion must travel a minimum distance, within a certain amount of time, and reach at least a minimum speed, before indications of adjustment will be provided. Another combination of thresholds can require that an object motion must travel no more than a maximum distance, within a certain amount of time, and not pass a maximum speed, such that the system will begin or continue indications of adjustment The exact values of these thresholds vary with a myriad of factors, such as details of the sensing technology, user interface design, and operating conditions. The threshold values may also differ with directions/manners of adjustment, which adjustment is selected, and user preferences. To accommodate this, the threshold values can be made adjustable, such as to change the value in response to determined noisiness of the environment, prior history of typical user input speeds and distances, which adjustment is currently selected, which direction/manner of adjustment is current active, user definition, or the like.

One issue where a threshold may be particularly applicable is in determining when object motion has crossed from one region to another. For example, it may be desirable to require travel into the region a certain distance before adjustment associated with that start tab is begun. This may be quite useful for systems where a start tab is close to other start tabs configured to indicate different types of adjustment. To start adjustment associated with the first start tab, the object motion must first travel into the adjustment region a certain distance. Otherwise, no indications or indications reflective of the adjustment region will be generated. This can implement a "hysteresis" in the operation of the adjustment regions, based on the assumption that the user wants to continue a current operation when using a continuous stroke without leaving the proximity of the sensing region.

The present invention thus provides a proximity sensor device and method that facilitates improved system usability. Specifically, the proximity sensor device and method provide the ability for a user to easily select the type of adjustment inputted by the proximity sensor device using one or more start tabs. The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. A proximity sensor device, the proximity sensor device comprising:
   a sensor, the sensor adapted to detect object motion proximate the sensor, the
   sensor including:
   an adjustment region;
   a first start tab adjacent to the adjustment region; and
   a processor, the processor coupled to the sensor and adapted to indicate adjustment of a first type responsive to sensed object motion originating in the first start tab and continuing in the adjustment region in a first of two opposite directions along a path proximate the adjustment region, where the adjustment of the first type is continued in response to the object motion continuing in the adjustment region in the first of the two opposite directions, and where the processor is further adapted to indicate adjustment of another type responsive to sensed object motion originating in the first start tab and continuing in the adjustment region in a second of the two opposite directions.

2. The proximity sensor device of claim 1 wherein the processor is further adapted to indicate adjustment of an additional type responsive to object motion originating in the adjustment region.

3. The proximity sensor device of claim 1 wherein:
the sensor further comprises a second start tab adjacent to the adjustment region; and
wherein the processor is adapted to indicate adjustment of a second type responsive to object motion originating in the second start tab and continuing in the adjustment region where the adjustment of the second type is continued in response to the object motion continuing in the adjustment region.

4. The proximity sensor device of claim 2 wherein the adjustment of a first type comprises adjusting a value of a first parameter, and wherein the adjustment of an additional type comprises adjusting a value of a second parameter.

5. The proximity sensor device of claim 4 wherein the first parameter comprises playback speed and wherein the second parameter comprises volume control.

6. The proximity sensor device of claim 1 wherein the adjustment of a first type comprises a user interface navigation.

7. The proximity sensor device of claim 6 wherein the user interface navigation comprises at least one of scrolling, cursor control and menu navigation.

8. The proximity sensor device of claim 1 wherein the proximity sensor device is implemented to input to an electronic device.

9. The proximity sensor device of claim 1 wherein the adjustment region has a substantially circular shape.

10. The proximity sensor device of claim 1 wherein the adjustment region has a substantially rectangular shape.

11. The proximity sensor device of claim 1 wherein the adjustment region has a substantially annular shape that surrounds an interior region.

12. The proximity sensor device of claim 11 further comprising at least one input button in the interior region.

13. The proximity sensor device of claim 1 wherein the sensor comprises a capacitive sensor adapted to detect object motion capacitively.

14. The proximity sensor device of claim 1 wherein adjustment of the another type is opposite adjustment of the first type.

15. A proximity sensor device, the proximity sensor device comprising:
a capacitive sensor, the capacitive sensor adapted to detect object motion proximate the sensor capacitively, the capacitive sensor including:
an adjustment region;
a first start tab extending from the adjustment region;
a second start tab extending from the adjustment region; and
a processor, the processor coupled to the capacitive sensor and adapted to indicate adjustment of a first type responsive to object motion originating in the first start tab and continuing in the adjustment region in a first of two opposite directions along a path proximate the adjustment region, where the adjustment of the first type is continued in response to the object motion continuing in the adjustment region in the first of the two opposite directions, and where the processor is further adapted to indicate adjustment of another type responsive to sensed object motion originating in the first start tab and continuing in the adjustment region in a second of the two opposite directions, the processor further adapted to indicate adjustment of a second type responsive to object motion originating in the second start tab and continuing in the adjustment region, where the adjustment of the second type is continued in response to the object motion continuing in the adjustment region.

16. The proximity sensor device of claim 15 wherein the processor is further adapted to indicate selection of an item responsive to object lifting from the adjustment region.

17. The proximity sensor device of claim 15 wherein the adjustment of the first type is changeable responsive to other user input.

18. The proximity sensor device of claim 17 wherein the other user input comprises at least one of pressing a tab key, using multiple input objects and using multiple taps.

19. A input device for a media player, the input device comprising:
a capacitive sensor, the capacitive sensor adapted to detect object motion proximate the sensor capacitively, the capacitive sensor including:
an annular-shaped adjustment region, the annular-shaped adjustment region having an outer perimeter and an inner region;
a first start tab extending from the outer perimeter of the annular-shaped adjustment region;
a second start tab extending from the outer-perimeter of the annular shaped adjustment region;
a button in the inner region; and
a processor, the processor coupled to the capacitive sensor and adapted to indicate an increase in media player volume responsive to object motion originating in the first start tab and continuing in the adjustment region in a first direction, the processor further adapted to indicate a decrease in the media player volume responsive to object motion originating in the first start tab and continuing in the adjustment region in a second direction, the processor further adapted to indicate a change in media player playback speed responsive to object motion originating in the second start tab and continuing in the adjustment region.

20. The proximity sensor device of claim 19 wherein the button comprises a play button, and wherein the processor is adapted to indicate a change in playing status responsive to object motion proximate the play button.

21. The proximity sensor device of claim 20 wherein the change in playing status comprises a change to playing from pausing when a current playing status is pausing, and wherein the change in playing status comprises a change from pausing to playing when the current playing status is playing.

22. The proximity sensor device of claim 19 wherein the processor is adapted to indicate an increase in media player volume responsive to object motion originating in the first start tab and continuing in the adjustment region in a first direction, and wherein the processor is adapted to indicate a decrease in media player volume responsive to object motion originating in the first start tab and continuing in the adjustment region in a second direction.

23. The proximity sensor device of claim 19 wherein the processor is adapted to indicate a fast forward change in media player playback speed responsive to object motion originating in the second start tab and continuing in the adjustment region in the first direction, and wherein the processor is adapted to indicate a reverse change in media player playback speed responsive to object motion originating in the second start tab and continuing in the adjustment region in the second direction.

24. A method of indicating adjustment in a device, the method comprising:

monitoring to detect object motion proximate a proximity sensor, the proximity sensor including an adjustment region, a first start tab adjacent to the adjustment region; and selectively indicating adjustment of a first type responsive to object motion originating in the first start tab and continuing in the adjustment region in a first of two opposite directions along a path proximate the adjustment region, where the adjustment of the first type is continued in response to the object motion continuing in the adjustment region in the first of the two opposite directions, and where the processor is further adapted to indicate adjustment of another type responsive to sensed object motion originating in the first start tab and continuing in the adjustment region in a second of the two opposite directions.

25. The method of claim 24 wherein the proximity sensor further comprises a second start tab adjacent to the adjustment region, and further comprising the step of selectively indicating adjustment of a second type responsive to object motion originating in the second start tab and continuing in the adjustment region, where the adjustment of the second type is continued in response to the object motion continuing in the adjustment region.

26. The method of claim 24 further comprising the step of selectively indicating adjustment of an additional type responsive to object motion originating in the adjustment region.

27. A program product comprising:

a) a proximity sensor program, the proximity sensor program adapted to indicate adjustment of a first type responsive to object motion originating in a first start tab of a proximity sensor device and continuing in a first of two opposite directions along a path proximate an adjustment region of the proximity sensor device, where the adjustment of the first type is continued in response to the object motion continuing in the adjustment region in the first of the two opposite directions, and where the processor is further adapted to indicate adjustment of another type responsive to sensed object motion originating in the first start tab and continuing in the adjustment region in a second of the two opposite directions; and b) computer-readable media bearing said proximity sensor program.

28. The program product of claim 27 wherein the proximity sensor program is further adapted to selectively indicate adjustment of a second type responsive to object motion originating in a second start tab of the proximity sensor device and continuing in the adjustment region of the proximity sensor device, where the adjustment of the second type is continued in response to the object motion continuing in the adjustment region.

29. The program product of claim 27 wherein the proximity sensor program is further adapted to selectively indicate adjustment of an additional type responsive to object motion originating in the adjustment region of the proximity sensor device.

\* \* \* \* \*